United States Patent
Grundberg et al.

(10) Patent No.: US 6,374,691 B1
(45) Date of Patent: Apr. 23, 2002

(54) DEVICE FOR ASSISTED GEAR SHIFTING OF A TRANSMISSION

(75) Inventors: Jan Grundberg, Göteborg; Oddbjörn Hallenstvedt; Jukka Tuuliainen, both of Köping, all of (SE)

(73) Assignee: AB Volvo Pents (SE)

( * ) Notice: Subject to any disclaimer, the term of this patent is extended or adjusted under 35 U.S.C. 154(b) by 0 days.

(21) Appl. No.: 09/137,993

(22) Filed: Aug. 21, 1998

(30) Foreign Application Priority Data

Aug. 25, 1997 (SE) ............................................. 9703048

(51) Int. Cl.[7] ............................ B63H 5/13; F16H 59/74
(52) U.S. Cl. ...................... 74/473.12; 74/470; 440/86
(58) Field of Search ..................... 74/473.12, 473.29, 74/480 B; 440/75, 86, 84, 87; 477/177, 101; 123/335, 198 F, 198 DB

(56) References Cited

U.S. PATENT DOCUMENTS

| 4,525,149 A | 6/1985 | Broughton et al. | |
|---|---|---|---|
| 4,952,181 A | * 8/1990 | Entringer et al. | 440/86 |
| 4,986,776 A | * 1/1991 | Hensel et al. | 440/87 |
| 5,050,461 A | * 9/1991 | Onoue et al. | 440/86 X |
| 5,122,084 A | 6/1992 | Lieb et al. | |
| 5,692,992 A | * 12/1997 | Arvidsson et al. | 477/101 |
| 5,700,168 A | * 12/1997 | Mondek et al. | 440/86 X |

* cited by examiner

Primary Examiner—Lenard A. Footland
Assistant Examiner—Colby Hansen
(74) Attorney, Agent, or Firm—Lerner, David, Littenberg, Krumholz & Mentlik, LLP

(57) ABSTRACT

An apparatus for shifting a transmission coupled to an engine including a controller for shifting the transmission between operating modes, a control lever for switching the transmission, and an actuator for actuating the control lever in response to shifting of the controller. The apparatus includes a longitudinal tube connected to the controller, a cylindrical slide connected to the actuator for actuating the control lever in response to shifting of the controller, the longitudinal tube being coaxial with the cylindrical slide, a detector for detecting relative displacement between the longitudinal tube and the cylindrical slide, and a spring acting between the longitudinal tube and the cylindrical slide to prevent relative displacement between them until a force acting on one of them exceeds the spring force of the spring.

10 Claims, 2 Drawing Sheets

DEVICE FOR ASSISTED GEAR SHIFTING OF A TRANSMISSION

FIELD OF THE INVENTION

The present invention relates to a device for assisted gear shifting of a transmission. More particularly, the present invention is intended to be utilized for assisted gear shifting of a transmission belonging to a boat motor.

BACKGROUND OF THE INVENTION

In connection with driving arrangements for water vessels, for example in the form of motor driven leisure craft having outboard drives, an outboard drive is normally used which comprises a transmission for connecting the output shaft of the boat engine to the boat propeller shaft. The transmission may be utilized, in a known manner, to change the rotational direction of the propeller. More precisely, an adjustable gear shift control may be utilized to set the transmission in a certain operating mode which constitutes a position corresponding to forward propulsion of the boat, a position corresponding to rearward or reverse propulsion of the boat, or a neutral position.

A known transmission for outboard drives comprises a driving cogwheel which is arranged so that it is rotated by the engine's output shaft and which transfers the power of the engine to a propeller shaft through either one of two driven cogwheels which are axially spaced apart on a vertical axle, which, in turn, is connected to the propeller shaft. For this purpose, the transmission comprises an adjustable coupling arrangement which consists of a conical clutch arranged in connection with the vertical axle. Using this clutch arrangement, one of the two driven cogwheels may be connected so that a mechanical connection is established from the engine shaft to the propeller shaft. The direction of rotation of the propeller shaft will then depend on which of the two driven cogwheels that is connected. If neither of the two driven cogwheels is connected, the neutral position is engaged.

Furthermore, the gear shift control is connected to the conical clutch by means of a mechanical push-pull wire whose inner core is influenced in a known manner either forwards or backwards when turning the gear shift control in the corresponding direction. In this manner, the transmission may be set to the desired mode of operation.

One drawback in connection with known transmissions exists in those cases when a particularly high torque is transmitted (more exactly a torque in the order of 50 Nm or higher). In such cases, a high resistance can be felt in the control during shifting of the transmission from forward to reverse or to the neutral position. This is due to the fact that the torque, which is generated by the propeller when the forward or backward position is engaged, causes a certain resistance against the axial movement of the conical clutch which is required for the transmission to be shifted from forward to rearward operation and to the neutral position.

According to a known technique, the above mentioned problem may be solved by regulating the engine in such a way that the ignition is temporarily interrupted for one or more of its cylinders when a high resistance to shifting is present. In this way, an assisted shifting is obtained in which a strongly reduced resistance is experienced.

A previously known device which provides such an assisted shifting for a transmission of a boat engine is shown in the patent U.S. Pat. No. 4,525,149. This device comprises a pivotingly suspended shifting link which may be operated by a lever for setting a reversing gear in a forward, backward or neutral position. The device further comprises a push-pull wire which is connected between a lever and a further pivotable means, which in turn is attached to the shifting link by means of a special linking means which carries a displaceable component. This displaceable component is spring biased with a certain force which corresponds to a predetermined resistance when shifting the reversing gear. Should a force exceeding this predetermined force be necessary for shifting, the displaceable component will cancel out the spring bias and be moved a small distance. This displacement may be detected using a position transducer, which will send a signal to the engine to interrupt the ignition to at least one engine cylinder. This will result in a lowered resistance during shifting.

Although the above mentioned device in principle provides a satisfactory assisted shifting, it has certain shortcomings. Foremost is the fact that it is constructed from a large number of parts, of which a plurality are pivotably arranged on the boat engine. This creates a device having an unnecessarily complicated construction and too many parts. This constitutes a negative factor regarding wear, service and cost. A further disadvantage is that a mechanical play may develop where the wire of the lever is connected to the pivotable means.

SUMMARY OF THE INVENTION

An object of the present invention is to provide an improved device for assisted shifting of a transmission, especially for a boat engine, which comprises a small number of parts, has a simple and reliable construction and has an effective functioning.

In accordance with the present invention, this and other objects have now been realized by the invention of apparatus for shifting a transmission coupled to an engine and including a controller for shifting the transmission between at least two operating modes, a control lever for switching the transmission, and an actuator for actuating the control lever in response to shifting of the controller, the apparatus comprising a first longitudinal member connected to the controller, a second longitudinal member connected to the actuator, the first longitudinal member being coaxial with the second longitudinal member, a detector for detecting relative displacement between the first and second longitudinal members, and a spring member acting between the first and second longitudinal members so as to prevent the relative displacement between the first and second longitudinal members until a force acting on one of the first and second longitudinal members exceeds the spring force of the spring member. In accordance with a preferred embodiment, the first longitudinal member is substantially tubular and the second longitudinal member comprises a substantially cylindrical slide member disposed within the first longitudinal member.

In accordance with one embodiment of the apparatus of the present invention, the spring member comprises a screw-shaped spring disposed around the second longitudinal member and within the first longitudinal member.

In accordance with another embodiment of the apparatus of the present invention, the first longitudinal member includes a first compression member and the second longitudinal member includes a second compression member, the spring member being disposed between the first and second compression members whereby the spring member is compressed between the first and second compression members when the force acting on the first and second longitudinal members exceeds the spring force of the spring member. In a preferred embodiment, the first longitudinal member is substantially tubular and the second longitudinal member comprises a substantially cylindrical slide member disposed within the first longitudinal member. In a preferred embodiment, the first longitudinal member includes a predetermined inner diameter, and the first compression member comprises a portion of the first longitudinal member having an inner diameter which is less than the predetermined inner diameter.

In accordance with another embodiment of the apparatus of the present invention, the second longitudinal member includes a predetermined inner diameter, and the second compression member comprises a portion of the second longitudinal member having an outer diameter which is greater than the predetermined outer diameter.

In accordance with another embodiment of the apparatus of the present invention, the detector comprises a position transducer, and the second longitudinal member includes at least one modified portion juxtaposed with the position transducer whereby the position transducer is adapted to detect the position of the at least one modified portion of the second longitudinal member. In accordance with another embodiment, the position transducer comprises an inductive position transducer.

In accordance with another embodiment of the apparatus of the present invention, the first longitudinal member is directly connected to the controller.

In accordance with another embodiment of the apparatus of the present invention, the second longitudinal member is connected to the control lever by means of the actuator, and the actuator includes an outer cover, the outer cover of the actuator being rigidly mounted with respect to the controller.

The present invention is intended to be used for the assisted shifting of the transmission of an engine, and comprises a first means which is connected to a lever for shifting the transmission between at least two modes of operation, a second means connected, by means of an actuator, to a control device for shifting the transmission, a detector for detecting a displacement of the first means relative to the second means, and means for limiting the power of the engine if such displacement is detected. The present invention is characterized by the fact that the first means and the second means are arranged for coaxial movement relative to each other, and the device comprises a spring means arranged to prevent such movement when a force, which is smaller than the spring force of the spring means, is acting upon the first means, and to allow said movement when the acting force is greater than that spring force.

Several advantages are achieved through the present invention. Foremost among them is the fact that the device according to the present invention has a small number of components, which results in low material, production and service costs. Furthermore, the present invention provides for completely coaxial movement of the first means relative the second means if the spring force is exceeded (i.e. movement of both means is substantially along a common axis), whilst it otherwise functions as a rigid connection between a lever and a transmission. Thus, it does not require a special arrangement for mounting in a boat, but constitutes, in principle, an extension of a wire which is attached to the above mentioned control means for the engine transmission. The device according to the present invention may further be arranged directly next to such a means, i.e. without any intermediate wire. This eliminates the risk of play at the attachment point of such a wire.

BRIEF DESCRIPTION OF THE DRAWINGS

The invention will now be described in greater detail by way of example only and with reference to a particular embodiment illustrated in the annexed drawings, in which.

DETAILED DESCRIPTION

Figure 1:
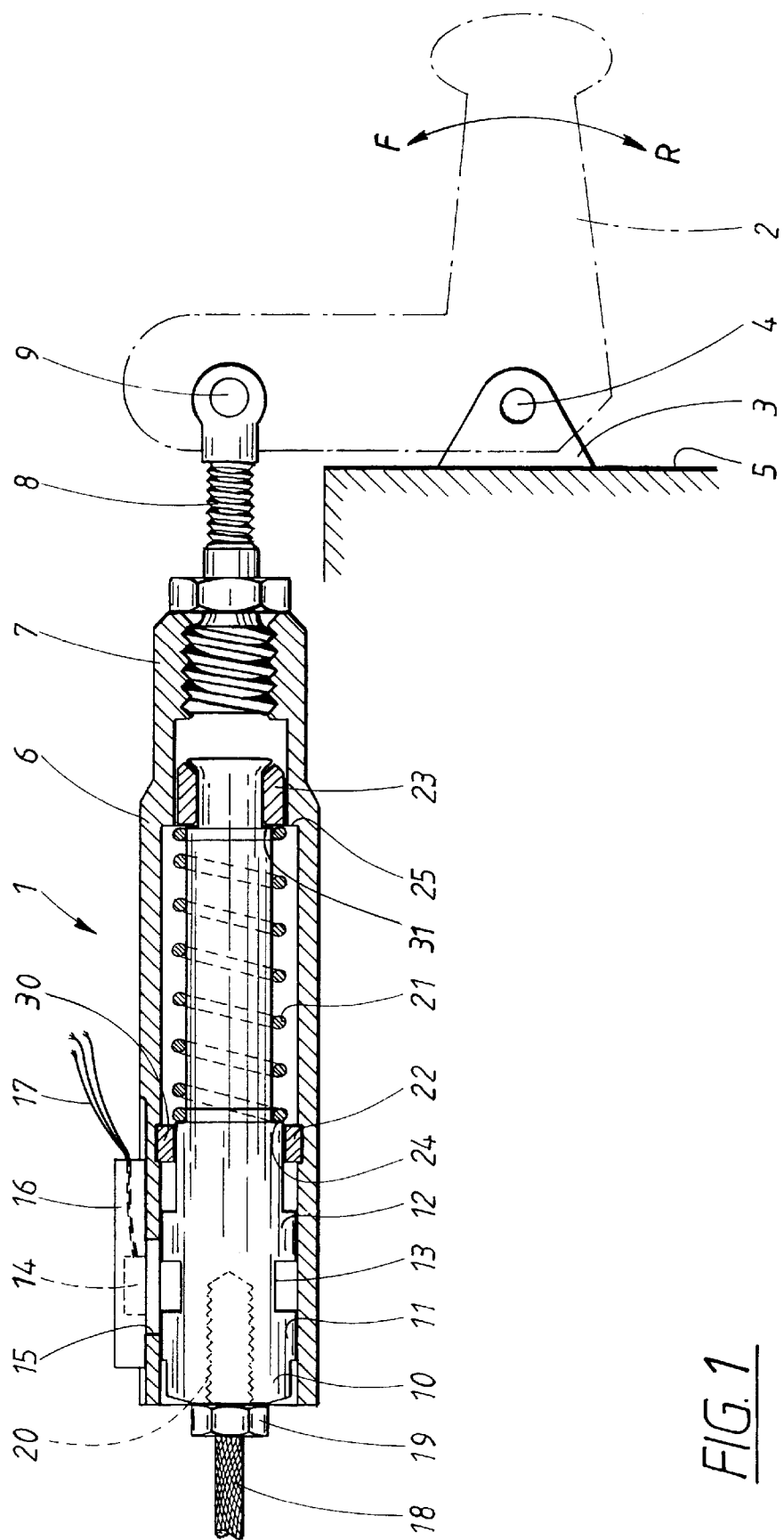
FIG. 1 is a side, elevational, schematic view, partly in cross-section, of a device according to the present invention.

In FIG. 1 a device 1 is shown somewhat schematically for assisted shifting of a transmission, according to the present invention. According to the preferred embodiment, the device 1 is intended to be used together with a boat engine (not shown) and is arranged next to a control means 2 for selecting the desired shifting position of the transmission.

In a previously known manner, the control means 2 consists of a lever which is pivotably suspended in a console means 3, by means of a pivot axle 4. The console means 3 is, in turn, fixedly arranged, suitably in a construction 5 belonging to the control means 2. The control means 2 may thus be pivoted forwards and backwards, according to what is indicated with the letters "F" and "R" in FIG. 1. The control means 2 may be set either in a neutral position, which corresponds to an idling engine, or a position for forward propulsion (or alternatively for rearward propulsion) of the boat, i.e. for switching in a gear in the forward direction (or alternatively in a rearward direction).

According to the above explanation, especially with engines providing high torque, a strong resistance may occur when switching from the forward or rearward position to the neutral position. For this reason, the device 1 according to the present invention is arranged to provide for assisted switching, i.e. facilitated switching from the forward or reverse position to the neutral position. For this purpose, the device 1 comprises a first means 1 in the form of a sleeve 6 which is connected to the control means 2. The sleeve 6 is shaped in the form of a substantially cylindrical tube, one end part 7 of which is intended to be an attachment for an interlocking means 8, which in turn is a connection between the control means 2 and the sleeve 6. The interlocking means 8 is preferably a double screw, one end of which for this reason has threads which are screwed into internal threads in the end part 7 of the sleeve 6 and the other end of which is threaded in an axle bar 9 of the control means 2.

The sleeve 6 carries a second means in the form of a slide 10 which is axially slidable within the sleeve 6, i.e. slidable in the longitudinal direction of the sleeve 6. The slide 10 is substantially cylindrical and is designed having a plurality of different sections with different diameters. More specifically, the slide 10 comprises two sections, 11 and 12, respectively, which have an outer diameter which is somewhat smaller than the inner diameter of the sleeve 6. Between these sections, 11 and 12, is a section 13 having a substantially smaller diameter, according to FIG. 1. This last-mentioned section 13 is located such that its position corresponds to the location of a detector means 14, which preferably consists of an inductive position detector. The detector 14 is mounted at a hole 15 through the periphery of the sleeve 6 with the help of a detector holder 16, which is arranged on the sleeve 6. The detector 14 is furthermore connected to a control unit (not shown) for the boat engine by means of an electrical connection 17. This control unit is arranged in a conventional way to regulate the ignition of the engine cylinders.

As is described in further detail below, the detector is arranged to detect whether the slide 10 is displaced axially, i.e. if the section 13 having a comparatively small diameter is moved to either side so that it no longer is situated directly in front of the detector 14. If this is the case, the detector 14 will generate a signal to the engine control unit, which in turn causes the ignition to be switched off to at least one of the engine cylinders.

The end of the slide 10 which is facing away from the control means 2 is shaped as a fitting for a wire 18. The outer casing of the wire 18 is not shown in FIG. 1. The end part 19 of the slide 10 is preferably shaped as a hexagonal grip which is protruding from the sleeve 6 and which furthermore comprises an internal, threaded hole 20. In this way, the wire 18 may be fastened in the slide 10 and will then constitute an axial elongation of the slide 10.

The wire 18 is connected to the boat's shifting mechanism (not shown), which preferably comprises a transmission of an essentially known type and which has a vertical shaft on which two axially spaced apart, conical cogwheels are arranged, and the vertical shaft in turn is connected to the boat propeller shaft. Either of these cogwheels may be engaged with a driving cogwheel on the engine output shaft so that the engine power may be transferred to the propeller shaft. The shifting mode, i.e. the direction of rotation of the propeller shaft, is then determined by which one of the two driven cogwheels is engaged. If neither of these two cogwheels is engaged, the neutral position is at hand.

From FIG. 1 it is apparent that the sleeve 6 carries a spring means 21 which runs around the slide 10. The spring means 21 is held in place in a compressed state between a locking ring 22, which is fastened in a corresponding internal groove 30 in the sleeve 6, and an end piece 23 which is part of the slide 10. This end piece 23 preferably consists of a cylindrical part having an outer diameter which is somewhat smaller than the inner diameter of the sleeve 6. Furthermore, it is apparent from FIG. 1 that the slide 10 has an outer step 24 which is formed by a reduction of the diameter of the slide 10. When the device is in the state which is shown in FIG. 1, the outer step 24 is situated in substantially the same axial position as the locking ring 22. The sleeve 6 further has an inner step 25 which is formed by an increase of the inner diameter of the sleeve 6. In the state shown in FIG. 1, the inner step 25 is situated in substantially the same axial position as the end piece 23 which is facing the spring means 21.

The inner surface of the end piece 23 is shaped so that it is somewhat bevelled at one end. In this manner, the end piece 23 may be fastened in the slide 10 by riveting on the end of the slide 10, whereby the material of the end of the slide 10 will extend and lock the end part 23 against a surface which is defined by a further step 31 on the slide 10.

The functioning of the slide will now be described. If the control means 2 is not subject to any force in the "F" or "R" directions, the slide 10 will be situated in the position which is shown in FIG. 1, i.e. the part 13 of the slide 10 which has a relatively small outer diameter will be directly in front of the detector 14. If the control means 2 is actuated in the "F" direction, the whole device 1 will primarily be displaced towards the left, during which a substantially rigid connection is present between the sleeve 6 and the slide 10. During shifting, a certain shifting resistance may be felt when manoeuvering the control means 2, as has been explained above. When this resistance exceeds a force which corresponds to the spring force supplied by the spring means 21, the spring means 21 will start being compressed. More exactly, the spring means 21 will then be compressed between the inner step 25 of the sleeve 6 and the outer step 24 of the slide 10. The sleeve 6 will thus be displaced axially relative the slide 10 so that the part 11 will approach a position in front of the detector 14. As mentioned above, the detector suitably comprises an inductive position transducer of a known type. This type of transducer comprises an oscillator which emits an electromagnetic field which is affected by the possible presence of electrically conductive objects. When the slide 10 (which preferably is made of stainless steel) is displaced so that the part 11 approaches a position directly in front of the detector 14, the electric field will be disturbed. This causes the detector 14 to deliver a signal to the engine control unit, which as mentioned above will cause the ignition to at least one of the engine cylinders to be switched off.

Correspondingly, the control means 2 may be actuated in the "R" direction. When a low shifting resistance is present, a substantially rigid connection is present between the sleeve 6 and the slide 10. At the shifting resistance which exceeds the spring force of the spring means 21, the sleeve 6 will be displaced relative to the slide 10 while the spring means 21 will be compressed between the locking ring 22 and the end piece 23. This will cause the section 12 of the slide 10 to be situated in front of the detector 14. In an analogous manner to what has been explained above, the detector 14 will then deliver a signal to the engine control unit for switching off the ignition to at least one engine cylinder.

Figure 2:
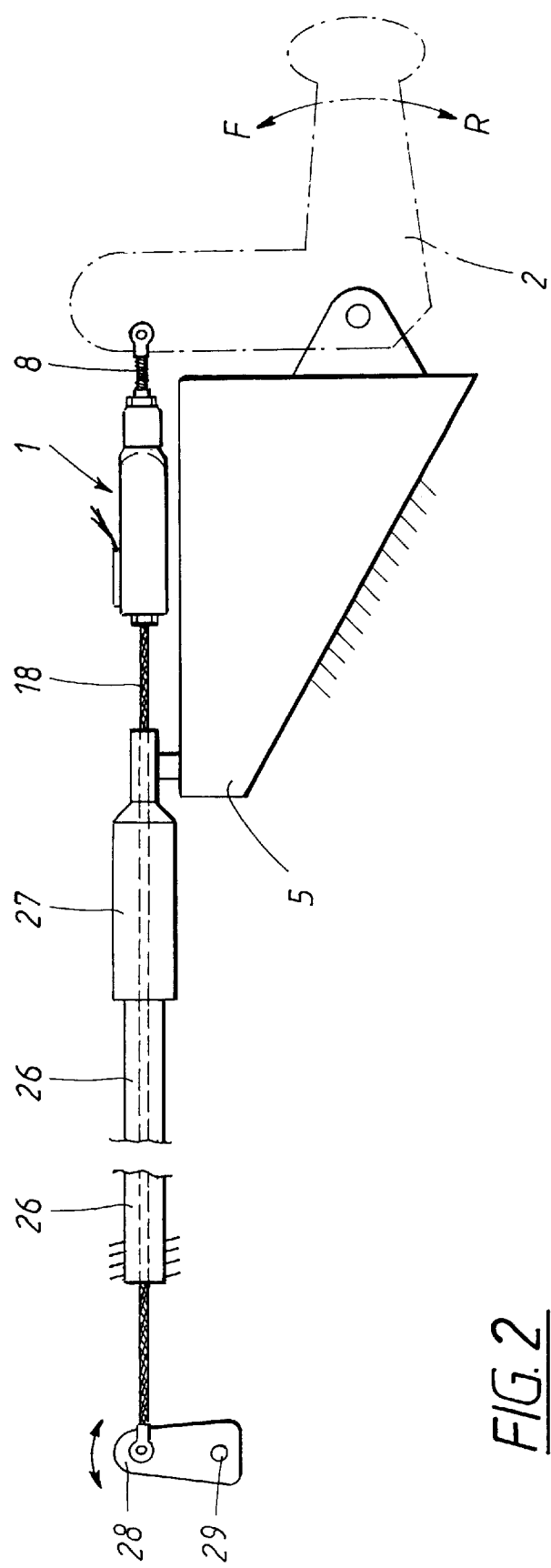
FIG. 2 is a side, elevational, schematic view of the device according to the present invention arranged in connection with the gear shift control means of a boat.

FIG. 2 shows schematically how the invention may be mounted and used in a boat. The device 1 for assisted shifting is then connected to a wire 18 which, in turn, has an outer cover 26 which is fastened to special extension housing 27. This extension housing 27 comprises a substantially cylindrical means to which the outer cover 26 is fixedly arranged. The extension housing 27 is, in turn, fixedly arranged in construction 5, which belongs to the control means 2 and which in turn is fixedly arranged in the boat.

Furthermore, the other end of the wire 18 is connected to a control means in the form of a control lever 28 which, in turn, is pivotably suspended, by means of an axle 29, and is arranged to actuate a transmission (not shown) connected to the boat's engine. This transmission may, for example, be of the type whose functioning has been described above. In this way, the transmission may be changed between forwards, reverse, and neutral positions respectively.

The device 1 according to the present invention may be assembled in the following manner. Firstly, the end piece 23 is put in position inside the sleeve 6, i.e. at the part of the sleeve 6 which is furthest to the right, according to FIG. 1. Thereafter, the spring means 21 is placed in the sleeve 6, whereafter the locking ring 22 is locked in its inner groove. Thereafter, the slide 10 is put in place, and its end part is pressed through the end piece 23. Finally, the end piece 23 is fixedly locked by riveting against the end of the slide 10, as discussed above.

The present invention is not limited to the embodiment described above and shown in the drawings, but may be varied within the scope of the appended claims. For example, the force which is obtained through the spring means 21 may be varied according to the amount of shifting resistance which is desirable before the slide 10 and the sleeve 6 will be displaced relative to each other. The sleeve 6 may furthermore be arranged in direct connection to the control means 2 (by means of the interlocking means 8) or be connected to the control means 2 by means of an intervening actuator means, for example a wire of the same type as wire 18 discussed above.

The present invention may be used for both inboard as well as outboard drives. The invention may also be used in connection with shifting mechanisms which utilize a conical clutch, as described above, or alternatively a dog clutch or some other type of transmission.

Although the term "boat" has been used above, the present invention is suitable for use in connection with both smaller pleasure crafts, larger ships and other water vessels where there is a need for assisted shifting of a transmission. The invention may, in principle, be used in other contexts than boats.

The present invention may be used in connection with boats having one, two or more propellers and a corresponding number of propeller shafts.

Concerning choices of material, the sleeve 6 is preferably made of aluminium or a suitable aluminium alloy. The slide 10 is, as mentioned above, preferably made of stainless steel.

The present invention may be used in such a way that the regulating signal which is initiated by the detector 14, and which switches off the ignition for at least one engine cylinder, is only valid for a certain limited time. This is a safety related advantage which makes it possible for the engine to still operate even if, for example, the detector 14 were to deliver a faulty signal.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for assisted shifting of a transmission coupled to an engine comprising a first longitudinal member for connection to a controller for shifting said transmission between at least two operating modes, a second longitudinal member for connection to a force-transmitting element for operating said transmission, said first longitudinal member being coaxially displaceable with respect to said second longitudinal member along a common axis defined by the longitudinal extension of said first and second longitudinal member, said force-transmitting element, said first longitudinal member, and said second longitudinal member being disposed on said common axis, a detector mounted on one of the first longitudinal member and second longitudinal member for detecting relative displacement between a first and second longitudinal members, and a spring member carried by said second longitudinal member and acting between said first and second longitudinal members so as to prevent said relative displacement between said first and second longitudinal members until a force acting on said first longitudinal member exceeds the spring force of said spring member to compress said spring member.

2. The apparatus of claim 1 wherein said first longitudinal member is substantially tubular and said second longitudinal member comprises a substantially cylindrical slide member disposed within said first longitudinal member.

3. The apparatus for claim 1 wherein said spring member comprises a screw-shaped spring disposed around said second longitudinal member and within said first longitudinal member.

4. The apparatus of claim 1 wherein said first longitudinal member includes a predetermined inner diameter and a portion having an inner diameter which is less than said predetermined inner diameter, and wherein said portion of said first longitudinal member comprises an end surface of said first longitudinal member.

5. The apparatus of claim 1 wherein said second longitudinal member includes a predetermined outer diameter, and a portion having an outer diameter which is greater than said predetermined outer diameter, said portion of said second longitudinal member comprising an end surface of said second longitudinal member.

6. The apparatus of claim 1 wherein said detector comprises a position transducer, and wherein said second longitudinal member includes at least one modified portion juxtaposed with said position transducer whereby said position transducer is adapted to detect the position of said at least one modified portion of said second longitudinal member.

7. The apparatus of claim 6 wherein said position transducer comprises an inductive position transducer.

8. The apparatus of claim 1 wherein said first longitudinal member is adapted to be directly connected to said controller.

9. The apparatus of claim 1 wherein said second longitudinal member is adapted to be connected to a control lever by means of an actuator including an outer cover rigidly mounted with respect to said controller.

10. The apparatus of claim 1 wherein said spring member comprises a single spring.

* * * * *

UNITED STATES PATENT AND TRADEMARK OFFICE
CERTIFICATE OF CORRECTION

PATENT NO.    : 6,374,691 B1
DATED         : April 23, 2002
INVENTOR(S)   : Grundberg et al.

It is certified that error appears in the above-identified patent and that said Letters Patent is hereby corrected as shown below:

<u>Title page,</u>
Item [73], "Pents" should read -- Penta --

<u>Column 4,</u>
Line 39, "means 1 in" should read -- means in --

<u>Column 7,</u>
Line 45, "member" should read -- members --

<u>Column 8,</u>
Line 1, "between a" should read -- between said --

Signed and Sealed this

Fifteenth Day of October, 2002

*Attest:*

*Attesting Officer*

JAMES E. ROGAN
*Director of the United States Patent and Trademark Office*